Patented Dec. 27, 1927.

1,653,817

UNITED STATES PATENT OFFICE.

WILLIAM H. MILLSPAUGH, OF SANDUSKY, OHIO, ASSIGNOR TO THE PAPER AND TEXTILE MACHINERY CO., OF SANDUSKY, OHIO, A CORPORATION OF OHIO.

BREAST ROLL FOR PAPER MACHINES AND THE LIKE.

Application filed April 8, 1925. Serial No. 21,685.

In paper making machines as heretofore ordinarily constructed the breast roll is fixed on a shaft which is often oscillated by the shaking mechanism employed in such machines, and the entire weight of the roll and shaft is included in the thrust or impact against the bearings which results from such arrangement, thereby causing trouble and annoyance and injury to the machine.

The main object of my invention is to overcome this difficulty and to provide a structure in which the breast roll rotates upon and independently of the shaft on which it is mounted, while the shaft is stationary and locked to the machine frame, so that only the weight of the shell is thrown against the bearings and that is taken up by radial thrust bearings.

A further object is to provide a breast roll revolubly mounted on its supporting shaft and provided with radial and end thrust anti-friction bearings adapted to facilitate rotation and reduce friction to a minimum.

Other objects are to provide a simple, efficient and durable structure of the character referred to adapted to be easily assembled and which is not liable to get out of order when in actual use and in which the anti-friction bearings are effectually protected against the entrance of dust or water, with consequent injury to the bearings; such structure being capable of use for various purposes.

The invention will first be hereinafter more particularly described, with reference to the accompanying drawings, which are to be taken as a part of this specification, and then pointed out in the claims at the end of the description.

In said drawings, Fig. 1 is a side elevation, partly in section, of a breast roll and associated parts embodying my invention, partly broken away;

Figure 1:
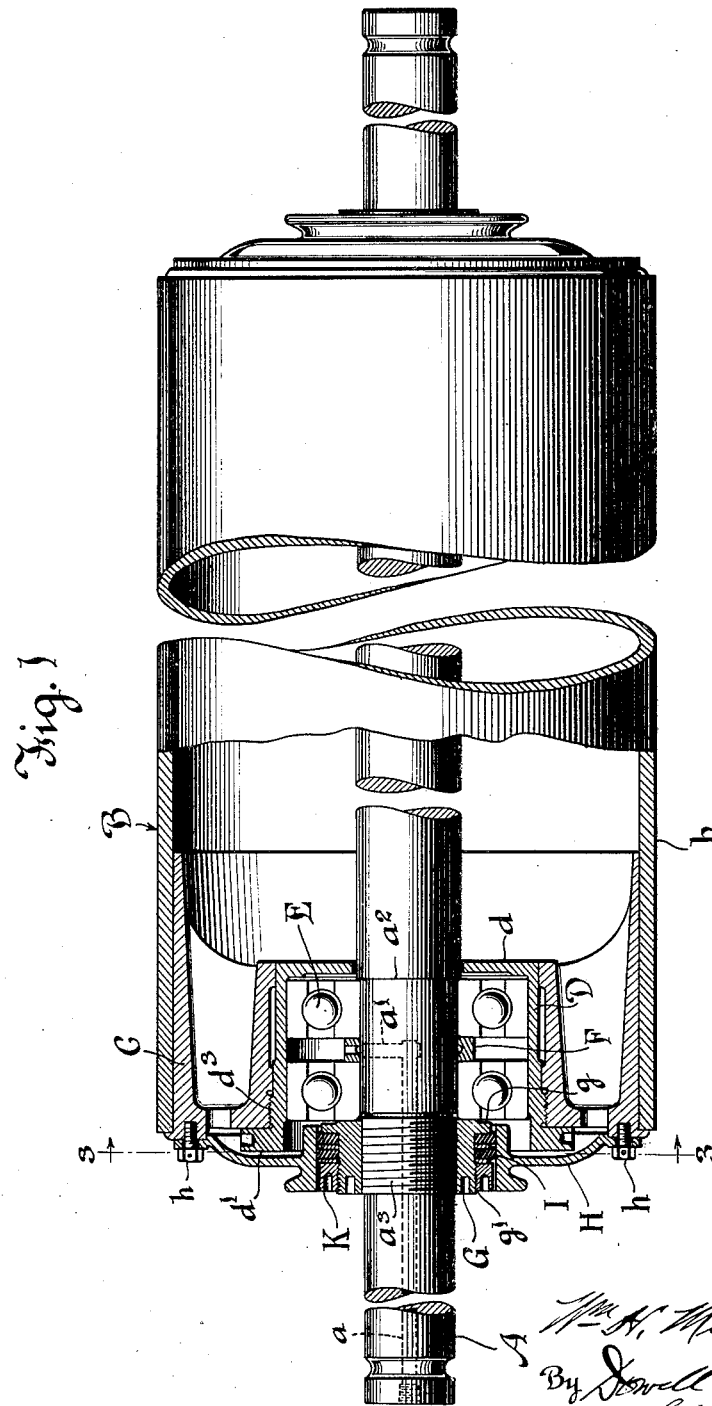
Figure 2:
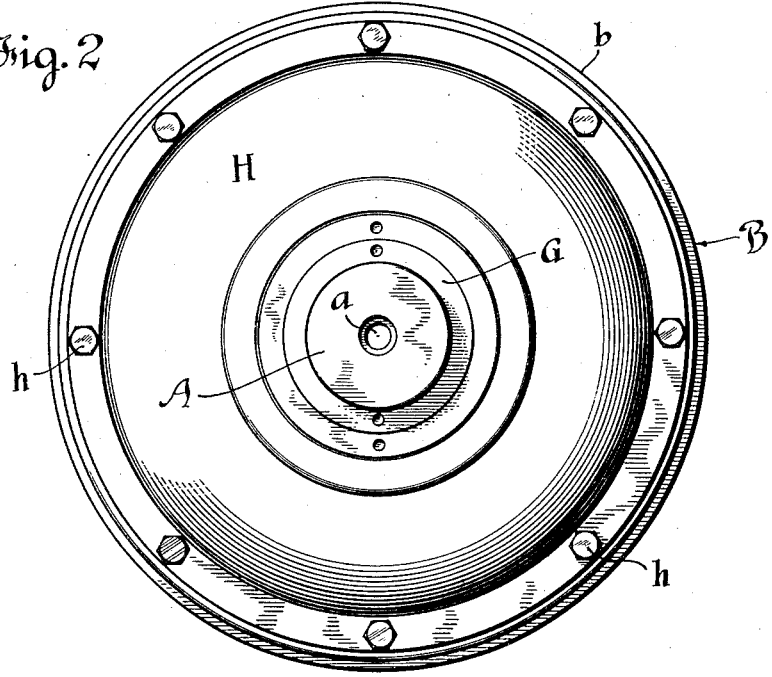
Fig. 2 is an end view of the structure shown in Fig. 1.
Figure 3:
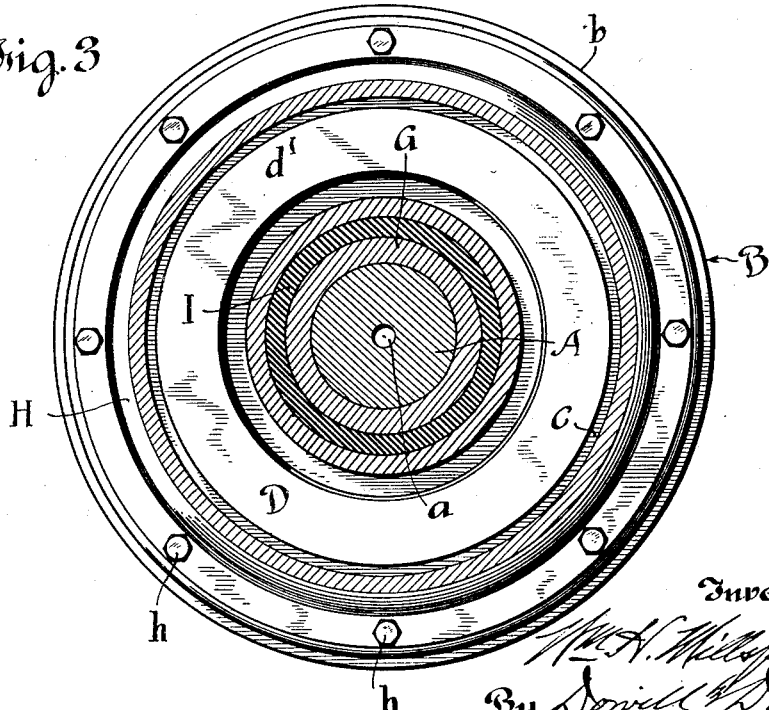
Fig. 3 is a section taken on the line 3—3 of Fig. 1.

Referring to said drawings, in which the same reference letters are used to denote corresponding parts in different views, the letter A denotes a shaft which is locked to the machine frame in such manner as to prevent rotation thereof, and on which is revolubly mounted a breast roll B, which consists essentially of a cylinder or shell $b$, in the ends of which are forcibly inserted fixed heads C, said heads being bored and interiorly threaded and surrounding the stationary shaft, so as to provide an annular space between the head and the shaft, within which is fitted a bearing member or cage D, surrounding anti-friction bearings E, preferably annular ball bearings of the Gurney type, though any suitable thrust bearing may be used. There are preferably two bearings of the type mentioned separated by a spacer section or ring F of ordinary construction which is in communication with an oil cup or feeding device (not shown) by means of a central duct or channel $a$ in the end of the shaft A leading from said oil cup or feeding device and terminating in a right angled portion $a^1$ which leads to an inlet port in said spacer section. These bearings are placed on a reduced portion of the shaft between a shoulder $a^2$ thus formed, and a threaded portion $a^3$ of the shaft, as shown. In the form shown, each bearing consists of two concentric race rings with a series of balls between the rings running in annular grooves or races in the confronting surfaces of said rings. The bearing member or cage D has end flanges $d$ and $d^1$, which extend therefrom in opposite directions, substantially at right angles thereto, and is exteriorly threaded as at $d^3$ and screwed into the fixed head C, and serves as a housing for the anti-friction bearings E which are confined on the shaft between the inner flange $d$ of the cage and a nut G screwed on a threaded part of the shaft A, said nut being fitted in a central opening in a cap or cover H which is secured to the outer end of the fixed head by means of set screws or bolts $h$ or other suitable fastening means. The outer end flange $d^1$ of the cage overlaps the outer side of the fixed head C and is confined between the head and cover, and concealed from view by said cover. The nut G has on the inner end thereof an annular radially projecting flange $g$, which forms an abutment for a packing ring or rings I, and is exteriorly threaded as at $g^1$ and has screwed thereon a gland K for compressing said packing between it and said flange $g$ to prevent dust or water from entering the bearing. Any suitable packing material adapted to be compressed by the gland may be used.

The advantages of a breast roll of the described construction will readily appear to persons familiar with or skilled in the use of paper making machines of the type with which my invention is specially designed to be used. It consists of a few simple and inexpensive parts adapted to be easily assembled or taken apart for repairs or to renew a part that may become worn or broken. The roll being revolubly mounted on a fixed shaft and provided with anti-friction bearings for taking both radial and end thrust insures a steady and easy running movement and reduces friction to a minimum while avoiding the trouble and injurious effects resulting from the oscillations of the shaft hereinbefore mentioned, and the assembled parts are not liable to undue wear or to be broken by ordinary usuage, or to get out of order, and the device as a whole is durable and efficient in practical use.

It will be observed that the anti-friction bearings are effectually housed within the body of the roll or shell, the fixed heads and the caps or cover-plates being rigidly secured to the shell so as to revolve therewith and in effect form a part thereof, and the expression "weight of the shell only is thrown against the bearings" should be read with this understanding; and I desire it to be understood that while the illustrated construction is especially designed and adapted for use as a breast roll for paper making machines, it is capable of use for other purposes, for example, where it is desired to bring one roll close to another roll, as the roll body itself serves as a housing for the anti-friction bearings, and I do not desire to limit the use of my invention as defined in the appended claims to a breast roll for paper making machines.

Having thus described my invention what I claim as new and desire to secure by Letters Patent of the United States is:

1. In combination, a breast roll revolubly mounted on a stationary shaft, and means whereby the weight of the shell only is thrown against the bearings in case of thrust or impact against said bearings resulting from oscillations of the shaft caused by the shaking mechanism employed in such machines; said means comprising axially bored or hollow heads fixed in the ends of the roll, annular housings removably inserted in said heads, annular anti-friction bearings comprising concentric race-rings and interposed rolling elements confined within said housings, cover-plates for said bearings through which said shaft extends, and means to prevent endwise movement of said bearings on the shaft.

2. In combination, a breast roll revolubly mounted on a stationary shaft, and means whereby the weight of the shell only is thrown against the bearings in case of thrust or impact against said bearings resulting from oscillations of the shaft caused by the shaking mechanism employed in such machines; said means comprising axially bored or hollow heads fixed in the ends of the roll, annular housings removably inserted in said heads, annular anti-friction bearings comprising concentric race-rings and interposed rolling elements confined within said housings, cover-plates for said bearings carried by the heads having centrally enlarged portions with openings therein through which the shaft extends, means to prevent the admission of water through said openings, and means to prevent end-wise movement of said bearings on the shaft.

3. The combination, in a paper making machine, of a breast roll revolubly mounted on a stationary shaft; said roll having an axially bored or hollow head fixed in one end thereof, an annular bearing member and housing removably inserted and secured in said head, an annular anti-friction bearing comprising concentric race-rings and interposed rolling elements confined within said housing, a cover-plate for said bearings carried by the head having a centrally disposed enlarged portion provided with a circular opening therein through which the shaft extends, a nut screwed on the shaft within said opening, packing material closing the space between said nut and said enlargement, and means for compressing the packing within said space.

4. The combination, in a paper making machine, of a breast roll revolubly mounted on a stationary shaft; said roll having an axially bored or hollow head fixed in one end thereof, an annular housing inserted and secured in said head having an inwardly extending flange on the inner end thereof closely surrounding the shaft and an outwardly extending flange on its outer end abutting against the outer end of the head, a cover-plate carried by the head having a centrally disposed circular opening therein through which the shaft extends, an annular anti-friction bearing comprising concentric race-rings and interposed rolling elements confined within said housing between said cover-plate and said inwardly extending flange, means to prevent the passage of water or dust through said opening; said means comprising a nut screwed on the shaft within said opening having packing material thereon, and means for compressing the packing within said opening.

5. In a paper making machine, a stationary driving shaft, a breast roll having anti-friction bearings at each end thereof revolubly mounted on said shaft, said roll consisting of a cylinder or shell having a fixed head in each end thereof, said head having a central circular opening therein and interiorly screw-threaded at the outer end of said opening, said anti-friction bearings comprising a cage of annular form screwed into said head and having on the inner end thereof an inwardly extending annular flange surrounding the shaft, a cap secured to said head having a central circular opening therein and enlarged around said opening, a nut screwed on said shaft within the opening through said enlargement and having an annular peripheral flange on the inner end thereof, anti-friction bearings confined on said shaft between the first named flange and said nut, a gland screwed on said nut within said enlargement of said cap, and packing material between said gland and the flange on said nut adapted to prevent water from entering the bearing.

6. In a paper making machine, a breast roll revolubly mounted on a stationary shaft, said roll consisting of a cylinder having fixed heads in the ends thereof provided with central circular openings therein and interiorly threaded at the outer ends of said openings, annular cages containing anti-friction bearings screwed in the openings in said heads, said cages each having on its inner end an inwardly projecting annular flange encircling the shaft, a cap secured to said head having a centrally disposed circular opening therein and enlarged around said opening, said shaft having screw threads thereon within the opening in said cap and an annular shoulder spaced from said screw-threads, said anti-friction bearings consisting of pairs of annular rings with balls between and the inner ring abutting against said shoulder; a nut screwed on said shaft within the opening in said cap, said nut having an annular peripheral flange on its inner end and exteriorly threaded on its outer end, a gland screwed on said nut, and packing material between said gland and said peripheral flange adapted to prevent dust and water from entering the bearing.

7. In a paper making machine, a breast roll revolubly mounted on a stationary shaft, said roll consisting of a cylinder having fixed heads in the ends thereof provided with central circular openings therein and interiorly threaded at the outer ends of said openings, annular cages containing anti-friction bearings screwed in the openings in said heads, said cages each having on its inner end an inwardly projecting annular flange encircling the shaft and on its outer end an outwardly projecting annular flange overlapping the outer end of said head, a cap secured to said head having a centrally disposed circular opening therein and enlarged around said opening, said shaft having screw threads thereon within the opening in said cap and an annular shoulder spaced from said screw-threads, said anti-friction bearings consisting of pairs of annular rings with balls between and the inner ring abutting against said shoulder; a nut screwed on said shaft within the opening in said cap, said nut having an annular peripheral flange on its inner end and exteriorly threaded on its outer end, a gland screwed on said nut, and packing material between said gland and said peripheral flange adapted to prevent dust and water from entering the bearing.

8. In a paper making machine, a breast roll consisting of a cylinder having fixed heads in the ends thereof provided with central circular openings and interiorly threaded at the outer end of said opening, an annular cage containing anti-friction bearings screwed in each of said openings, said cage having on its inner end an inwardly projecting annular flange encircling the shaft and on its outer end an outwardly projecting annular flange overlapping the outer end of said head, a cap secured to said head having a centrally disposed enlargement with a circular opening therein, said shaft having screw threads thereon within the opening in said enlargement, and an annular shoulder spaced from said screw threads, said bearings comprising annular rings with balls or rollers therebetween, the inner ring abutting against said shoulder, a nut screwed on said shaft within the opening in said central enlargement of said cap, said nut having an annular peripheral flange on its inner end and exteriorly threaded on the outer end thereof, a gland screwed on said nut, and packing material between said gland and said peripheral flange adapted to prevent dust and water from entering said bearing.

9. In combination with a stationary shaft, a breast roll revolubly mounted thereon, said roll consisting of a cylinder having hollow heads fixed in the ends thereof; said heads having annular anti-friction bearings therein encircling the shaft, and means on the end of the head for holding said bearings in place and preventing the admission of water thereto, said means consisting of a cap secured to the head and having a centrally disposed circular enlargement with a circular opening therein, a nut screwed on said shaft within said opening, packing rings confined within said opening between said nut and said enlargement, and means for compressing said packing rings.

10. In combination with a stationary shaft, a breast roll revolubly mounted thereon, said roll consisting of a cylinder having hollow heads fixed in the ends thereof; said heads having annular anti-friction bearings therein encircling the shaft, and means on the end of the head for holding said bearings in place and preventing the admission of water thereto, said means consisting of a cap secured to the head and having a centrally disposed circular enlargement with a circular opening therein, a nut screwed on said shaft within said opening, packing rings confined within said opening between said nut and said enlargement, and means for compressing said packing rings, said shaft having screw threads thereon coincident with the opening in said enlargement on which said nut is screwed and an annular shoulder spaced from said screw threads, for confining said anti-friction bearings between said nut and said shoulder.

11. In a paper making machine, a stationary shaft having a breast roll revolubly mounted thereon, said shaft having screw threads thereon near one end and a reduced portion adjacent said screw threads to provide a shoulder spaced from said threads, a cylindrical shell mounted on said shaft having secured in the ends thereof fixed heads each formed with a central opening and interiorly threaded at the outer end of said opening, anti-friction bearings housed in a cage screwed into the opening in said head, a cap or cover-plate secured to said head and having a central circular opening therein, a nut screwed on said shaft within the opening in said cap, said nut having on its inner end a peripheral flange and exteriorly threaded at the other end thereof, a gland screwed on said nut, and packing rings compressed between said gland and flange so as to close the space between said nut and cap and prevent water from entering said bearings.

12. In combination, a stationary shaft having a cylindrical shell revolubly mounted thereon; said shell having hollow heads fixed in the ends thereof, hollow bearing members inserted and secured in said heads, annular anti-friction bearings consisting of concentric race-rings with interposed balls housed within said bearing members; said heads each carrying a cover-plate having a centrally disposed circular opening therethrough, and means to prevent the entrance of water or dust through said opening; said means comprising a nut screwed on the shaft within said opening, packing material surrounding said nut and means carried by the nut for compressing said packing.

13. In combination with a stationary shaft and a cylindrical shell having hollow heads in opposite ends thereof revolubly mounted on said shaft, bearing members within said heads each forming a housing for anti-friction bearings and having on its inner end an inwardly extending annular flange closely surrounding the shaft, annular anti-friction bearings comprising concentric race-rings and interposed rolling elements arranged within the housing, a cover-plate for said bearings having a centrally disposed opening therein through which the shaft extends; and means for closing the opening through said cover-plate; said means comprising a nut screwed on the shaft having packing rings thereon arranged within said opening and means on said nut for compressing said packing; said bearings being confined between said cover-plate and the flange on said bearing member.

14. In combination with a breast roll adapted to be revolubly mounted on a stationary shaft; said roll having hollow heads fixed in the ends thereof, a radial and end thrust anti-friction bearing for the end of the roll comprising an annular bearing member adapted to be inserted and secured in the hollow head, and concentric rings with balls between the rings housed in said bearing member, together with means to prevent endwise movement of said rings.

15. In combination, a stationary shaft having a cylindrical shell revolubly mounted thereon; said shell having hollow heads fixed in the ends thereof, hollow bearing members inserted and secured in said heads, annular anti-friction bearings consisting of concentric race-rings with interposed balls housed within said bearing members; said shaft having a duct therein leading into said housing for introducing oil or other lubricant, and said heads each carrying a cover-plate having a centrally disposed tubular part, and means to prevent the admission of water or the escape of lubricant through said tube; said means comprising a nut screwed on the shaft within said tube and spaced from the interior surface thereof, packing material in said tube surrounding said nut, and means carried by the nut for compressing said packing.

In testimony whereof I affix my signature.

WILLIAM H. MILLSPAUGH